United States Patent [19]

Sheer

[11] 4,317,764
[45] Mar. 2, 1982

[54] POLYBUTYLENE TEREPHTHALATE MOLDING BLENDS

[75] Inventor: M. Lana Sheer, Chadds Ford, Pa.

[73] Assignee: E. I. Du Pont de Nemours and Company, Wilmington, Del.

[21] Appl. No.: 252,884

[22] Filed: Apr. 10, 1981

[51] Int. Cl.³ .............................................. C03L 67/00
[52] U.S. Cl. ............................... 524/449; 264/331.13;
525/63; 525/66; 525/69; 525/166; 525/173;
525/174; 524/513
[58] Field of Search ................. 260/40 R; 525/63, 66,
525/69, 166, 173, 174; 264/299, 331.13

[56] References Cited

U.S. PATENT DOCUMENTS 3,579,609  5/1971  Sevenich .............................. 525/166
4,172,859  10/1979  Epstein ................................ 428/402

FOREIGN PATENT DOCUMENTS 1208585  10/1970  United Kingdom ............ 260/40 R

Primary Examiner—J. Ziegler

[57] ABSTRACT

A polybutylene terephthalate homopolymer or copolymer molding blend having good impact resistance is obtained by incorporating into the resin a selected organic compound and an ethylene polymer.

12 Claims, No Drawings

POLYBUTYLENE TEREPHTHALATE MOLDING BLENDS

FIELD OF THE INVENTION

This invention relates to polybutylene terephthalate molding materials, and more specifically to such materials that may be molded to obtain shaped articles of improved impact strength.

BACKGROUND OF THE INVENTION

It is desirable to enhance the strength of articles molded from thermoplastic resins, such as polybutylene terephthalate. Usually a reinforcing material such as glass fiber, asbestos fiber or other fibrous material may be employed in the resin to increase strength. In addition, fillers such as glass beads, platelets, or particulate minerals may be used to aid in increasing modulus.

Even though reinforcing and filling materials enhance the strength of articles molded from the resin, it is desirable to obtain even stronger articles, and particularly desirable to obtain articles having good resistance to breakage on sudden impact.

SUMMARY OF THE INVENTION

A polybutylene terephthalate homopolymer or copolymer molding blend having good impact resistance is obtained by incorporating into the resin an organic compound selected from polyalkylene oxides and adipamide oligomers; and an ethylene polymer having ester or acid functionality and a modulus less than 50000 psi.

It has been found that the organic compound and the ethylene polymer act synergistically to improve impact resistance of the blend over that of a similar blend that does not contain the two additives.

The polybutylene terephthalate blends of this invention may be described as a blend of (a) 20-95% by weight of blend of polybutylene terephthalate having an inherent viscosity of at least about 0.5, or a copolymer of polybutylene terephthalate and less than 50% by weight of a comonomer polymerizable therewith;

(b) 0.1-10% by weight of blend of an organic compound having a molecular weight less than 16000 which is selected from the class consisting of a polyalkylene oxide and a polyhexamethylene adipamide oligomer; and (c) 5-35% by weight of blend of an ethylene polymer containing ester or acid functionality and having a modulus less than 50,000 psi.

The resin blend may also contain up to 60% by weight of blend of reinforcing or filling material.

DESCRIPTION OF THE INVENTION

The polybutylene terephthalate employed herein is one which has an inherent viscosity of at least 0.5 as measured by ASTM D-2857. The polybutylene terephthalate preferably has an upper limit on inherent viscosity of about 1.1. Inherent viscosity is measured in a 3:1 by volume ratio of methylene chloride and trifluoroacetic acid at 30° C. The polybutylene terephthalate can contain less than 50% by weight of other comonomers such as diethylene glycol, glutaric acid, polyethylene terephthalate or polyalkyene oxide, cyclohexane dimethanol, and other diols.

The reinforcing or filler materials employed herein include glass fibers, graphite fibers, aramid fibers, glass beads, aluminum silicate, asbestos, mica, and the like, and combinations of them. These materials, if present, are preferably present in an amount between 15 and 50 percent by weight of blend.

Representative polyalkylene oxides are polyether glycols having terminal hydroxyl groups. Du Pont "Teracol" materials are examples of this family. The preferred molecular weight range is 600–3000.

Polyhexamethylene adipamide oligomers include polyhexamethylene adipamide copolymer oligomers. For example, an adipamide oligomer of 66/69/610 nylons having $\sim$380 amine ends/10 g, $\sim$40 acid ends/10 g and a melting point of approximately 180° C. or a hexamethylene adipamide oligomer having $\sim$470 amine ends/10 g, $\sim$9 acid ends/10 g and a molecular weight of approximately 4200 can be used in this capacity.

Preferably the organic compound is present in an amount of 0.3–5% by weight of blend.

Representative ethylene polymers having carboxyl or ester fucntionality and a modulus less than 50,000, include adducts of ethylene and ethylenically unsaturated compounds containing carboxyl or carboxyl derivatives. A preferred ethylene polymer for adduct formation is a copolymer of ethylene, at least one $C_3$ to $C_6$ $\alpha$-olefin, and at least one nonconjugated diene. The adduct may be prepared as described in Flexman U.S. Pat. No. 4,026,067 or Caywood U.S. Pat. No. 3,884,882 and U.S. Pat. No. 4,010,223. Propylene is normally selected as the $C_3$–$C_6$ $\alpha$-olefin in preparing such polymers. Other $C_3$–$C_6$ $\alpha$-olefins, namely 1-butene, 1-pentene, and 1-hexene can be selected in place of or in addition to propylene in preparing the elastomeric polymers. Preferably the nonconjugated diene is monoreactive. Monoreactive nonconjugated dienes have one double bond which readily enters the polymerization reaction with ethylene and propylene, and a second double bond which does not, to any appreciable extent, enter the polymerization reaction. The nonconjugated diene imparts side chain unsaturation, which unsaturation is available for adduct formation. Monoreactive nonconjugated dienes include linear alipahtic dienes of at least six carbon atoms which have one terminal double bond and one internal double bond, and cyclic dienes wherein one or both of the carbon-to-carbon double bonds are part of a carbocyclic ring. Of these dienes, 1,4-hexadiene is preferred.

A class of preferred ethylene polymers include adducts of tetrapolymers made from ethylene, at least one $C_3$ to $C_6$ $\alpha$-monoolefin, at least one monoreactive nonconjugated diene, and at least one direactive nonconjugated diene such as 2,5-norbornadiene or 1,7-octadiene. A preferred polymer of this class is a tetrapolymer of ethylene, propylene, 1,4-hexadiene, and 2,5-norbornadiene.

The ethylenically unsaturated compound containing carboxyl groups or carboxyl derivatives that are used in adduct formation are preferably $\alpha,\beta$-ethylenically unsaturated carboxylic acids having from 3 to 8 carbon atoms, and esters of anhydrides thereof. Illustrative of such compounds are maleic acid, maleic anhydride, maleic acid monoethyl ester, fumaric acid, fumaric acid monoethyl ester, itaconic acid, vinyl benzoic acid, vinyl phthalic acid. These compounds provide pendant carboxyl or anhydride groups to the polymer.

It is generally desired to form adducts containing about 0.5 to 9 percent, and preferably about 1 to 5 percent, by weight of compound that contains carboxyl groups.

Other representative ethylene polymers of include ethylene/vinyl acetate/glycidyl methacrylate; ethylene/methyl acrylate/glycidyl methacrylate; and emulsion-type modifiers of methyl methacrylate/butadiene/styrene or methyl methacrylate/acrylonitrile/butadiene/styrene.

Preferably 15–30% by weight based on blend of the adduct will be employed on the blends of this invention.

It is believed that the organic compound reacts with the ethylene polymer at one functional site and with the polybutylene terephthalate at another site.

In addition to the components discussed hereinabove, the compositions of this invention may contain additives commonly employed with polyester resins, such as colorants, mold release agents, flame retardants, antioxidants, ultraviolet light or heat stabilizers and the like.

The compositions of this invention are prepared by intimately blending the components together by any convenient means to obtain an intimate blend. Neither temperature nor pressure are critical. For example, the polybutylene terephthalate can be mixed dry in any suitable blender or tumbler with the other components and the mixture melt-extruded. The extrudate can be chopped. If desired, a reinforcing or filling agent can be added after the first melt extrusion, and the resulting mixture can then be melt-extruded.

EXPERIMENTS

In the Experiments which follow, percents are based on total blend unless otherwise noted. The polybutylene terephthalate blends used in the Experiments were prepared as follows:

All ingredients except the glass were dry blended and then extruded through a 28 mm twin-screw extruder at a melt temperature of approximately 260°–270° C. The polybutylene terephthalate (PBT) was dried prior to blending. It had an inherent viscosity of 0.83. The extruded strands were chopped into pellets and dried at about 110° C. for 16 hours in a vacuum oven. The dried pellets were blended with the desired amount of OCF 419AA glass fiber (chopped to 3/16″) where used and extruded through a two-stage single screw extruder at a melt temperature of about 240°–260° C. The extruded strands were cooled, chopped into pellets and dried at about 110° C. for 16 hours in a vacuum oven. The pellets were molded into test bars in a 6 oz injection molding machine with a melt temperature of about 250° C., fast ram, 10 seconds injection forward time, 20 seconds mold close time, and a cavity temperature of about 90° C. The bars were 5″×½″×⅛″ for notched Izod and unnotched impact tests and ⅛″ thick ASTM D-638-Type I bars for tensile and elongation measurements.

Properties of the test bars were measured according to the following procedures:

Tensile strength and elongation were measured on injection molded bars by ASTM Method D638.

Notched Izod impact strength was measured on the injection molded bars by ASTM Method D256.

Unnotched impact strength was measured by cutting 5×½×⅛″0 injection molded bars to the size specified for the Izod test in ASTM Method D256, but without notching the bars, and otherside running the test by Izod method ASTM Method D256.

The three properties—elongation, notched Izod impact and unnotched impact strength—give a measure of the toughness or impact resistance of a material in end-use applications.

EXPERIMENTS 1–4

Experiments 1 and 2 demonstrate the use of polytetramethylene oxide or a polyamide oligomer with an ethylene polymer. These blends do not contain glass-reinforcing fibers. They illustrate that the addition of an organic compound as described herein with the ethylene polymer produced ductile rather than brittle notched Izod breaks in molded specimens. The comparable 30% glass-reinforced blends are also demonstrated in Experiments 3 and 4.

The blends of Experiments 1–4 are shown in Tables 1 and 2 along with the respective properties.

TABLE 1

| Sample | Experiment | | | |
|---|---|---|---|---|
| (% by weight) | A | B | 1 | 2 |
| % PTMO[1] | 0 | 0 | 1.05 | 0 |
| % Polyamide oligomer[2] | 0 | 0 | 0 | 2.0 |
| % Ethylene Polymer[3] | 0 | 20 | 28 | 20 |
| % PBT (IV 0.83) | 100 | 80 | ~71 | 78 |
| Notched Izod (ft-lb/in) | 1.0[4] | 3.1[4] | 20.4[5] | 15.9[5] |

[1]Polytetramethylene oxide with MW ≃1000.
[2]Nylon oligomer of a 66/69/610 copolymer having ~380 amine ends/10[6] g. and ~40 acid ends/10[6] g., MP ~180° C.
[3]A polymer of fumaric acid grafted onto a polymer of ethylene, propylene, 1,4-hexadiene and norbornadiene was employed. The graft polymer had an anhydride functionality of 0.42 meq/g acid.
[4]Brittle break.
[5]Ductile break.

TABLE 2

| Samples | Experiment | | | |
|---|---|---|---|---|
| (% by weight) | C | D | 3 | 4 |
| % PTMO[1] | 0 | 0 | 1 | 0 |
| % Polyamide oligomer[2] | 0 | 0 | 0 | 2 |
| % Ethylene Polymer[3] | 0 | 20 | 20 | 20 |
| % Fiber Glass[3] | 30 | 30 | 30 | 30 |
| % PBT[3] | 70 | 50 | 49 | 48 |
| Elong (%) | 2.6 | 1.5 | 5.1 | 4.5 |
| Unnotched Impact (ft-lb/in) | 15.7 | 9.4 | 21.7 | 16.0 |
| Notched Izod (ft-lb/in) | 2.0 | 2.6 | 6.0 | 3.4 |

[1]Same as used in Experiment 1.
[2]Same as used in Experiment 2.
[3]Same as used in Experiment 1.

EXPERIMENT 5

This experiment demonstrates the applicability of one of the toughening systems of this invention in a flame-retardant, 30% glass reinforced PET blend. This blend is identical to Example 1, except it contains 4.6% (wt) antimony oxide and 13% (wt) decabromodiphenyl ether (common flame retardant additives).

Blend information and properties are given in Table 3.

TABLE 3

| Sample | Experiment | |
|---|---|---|
| (% by weight) | A | 5 |
| % PTMO[1] | 0 | 1 |
| % Ethylene Polymer[2] | 0 | 20 |
| Elong - (%) | 2.3 | 4.0 |
| Unnotched Impact (ft-lb/in) | 14.9 | 17.6 |
| Notched Izod (ft-lb/in) | 2.2 | 6.1 |
| UL 94 Test Rating[3] | | |

TABLE 3-continued

| Sample | Experiment | |
|---|---|---|
| (% by weight) | A | 5 |
| at ⅛" and 1/16" thicknesses | V-O | V-O |

[1]Same as used in Experiment 1.
[2]Same as used in Experiment 1.
[3]Not UL certified.

I claim:

1. A polybutylene terephthalate molding blend consisting essentially of
   (a) 20-95% by weight of blend of polybutylene terephthalate having an inherent viscosity of at least about 0.5, or a copolymer of polybutylene terephthalate and less than 50% by weight of a comonomer polymerizable therewith;
   (b) 0.1-10% by weight of blend of an organic compound having a molecular weight less than 16000 which is selected from the class consisting of a polyalkylene oxide and a polyhexamethylene adipamide oligomer; and
   (c) 5-35% by weight of blend of an ethylene polymer containing ester or acid functionality and having a modulus less than 50,000 psi.

2. The blend of claim 1 wherein the blend contains up to 60% by weight of blend of a reinforcing agent or filler.

3. The blend of claims 1 or 2 wherein Component (b) is a polytetramethylene oxide.

4. The blend of claims 1 or 2 wherein Component (c) is an adduct of maleic anhydride and a copolymer of ethylene, propylene, and at least one linear aliphatic diene of at least 6 carbon atoms.

5. The blend of claim 4 wherein the diene is 1,4-hexadiene.

6. The blend of claim 2 wherein the reinforcing agent is glass fiber.

7. The blend of claim 2 wherein the reinforcing agent is glass fiber and mica.

8. The blend of claim 2 wherein the reinforcing agent is mica.

9. The blend of claim 1 which contains, additionally, a flame retardant.

10. The blend of claim 3 which contains, additionally, a flame retardant.

11. Process for preparing the blend of claim 1 which comprises mixing the components of the blend and then melt-extruding the mixture.

12. Process for preparing a molded article which comprises melting a blend of claim 1, placing the melted blend into a mold, and then allowing the blend to solidify.

* * * * *